United States Patent [19]

Friedberg

[11] 4,043,231

[45] Aug. 23, 1977

[54] APPARATUS FOR TRIMMING AND SCORING CUT SOD TO PRODUCE SEPARABLE PLUGS

[75] Inventor: Herbert L. Friedberg, Baltimore, Md.

[73] Assignee: The Shelburne Company, Baltimore, Md.

[21] Appl. No.: 732,522

[22] Filed: Oct. 14, 1976

[51] Int. Cl.² .............................................. B26D 3/08
[52] U.S. Cl. ........................................... 83/9; 83/10; 83/11; 83/408; 83/925 R
[58] Field of Search ................. 83/9, 10, 11, 12, 408, 83/407, 925 R

[56] References Cited

U.S. PATENT DOCUMENTS

| 1,303,221 | 5/1919 | Moore | 83/9 |
|---|---|---|---|
| 1,911,786 | 5/1933 | Barmakian | 83/300 X |
| 1,998,357 | 4/1935 | Carlson | 83/9 |
| 2,241,648 | 5/1941 | Spang | 83/11 |
| 3,495,487 | 2/1970 | Miner | 83/678 X |
| 3,818,790 | 6/1974 | Culp et al. | 83/408 |
| 3,909,342 | 9/1975 | Shook | 83/408 |

*Primary Examiner*—J. M. Meister
*Attorney, Agent, or Firm*—D. Paul Weaver

[57] ABSTRACT

Cut sod sections are conveyed through a first scoring and trimming apparatus which produces plural parallel cuts or scores through the sod in one coordinate direction while trimming the ends of each section to a uniform length. The cuts or scores are not made entirely through the root network. The sod sections are turned ninety degrees and placed in pairs on trays employed in subsequent packaging and are conveyed through a second scoring apparatus which produces plural parallel scores in the sod sections in a second coordinate direction. The first and second scorings are made in the soil side of the sod while it is conveyed grass side down.

3 Claims, 8 Drawing Figures

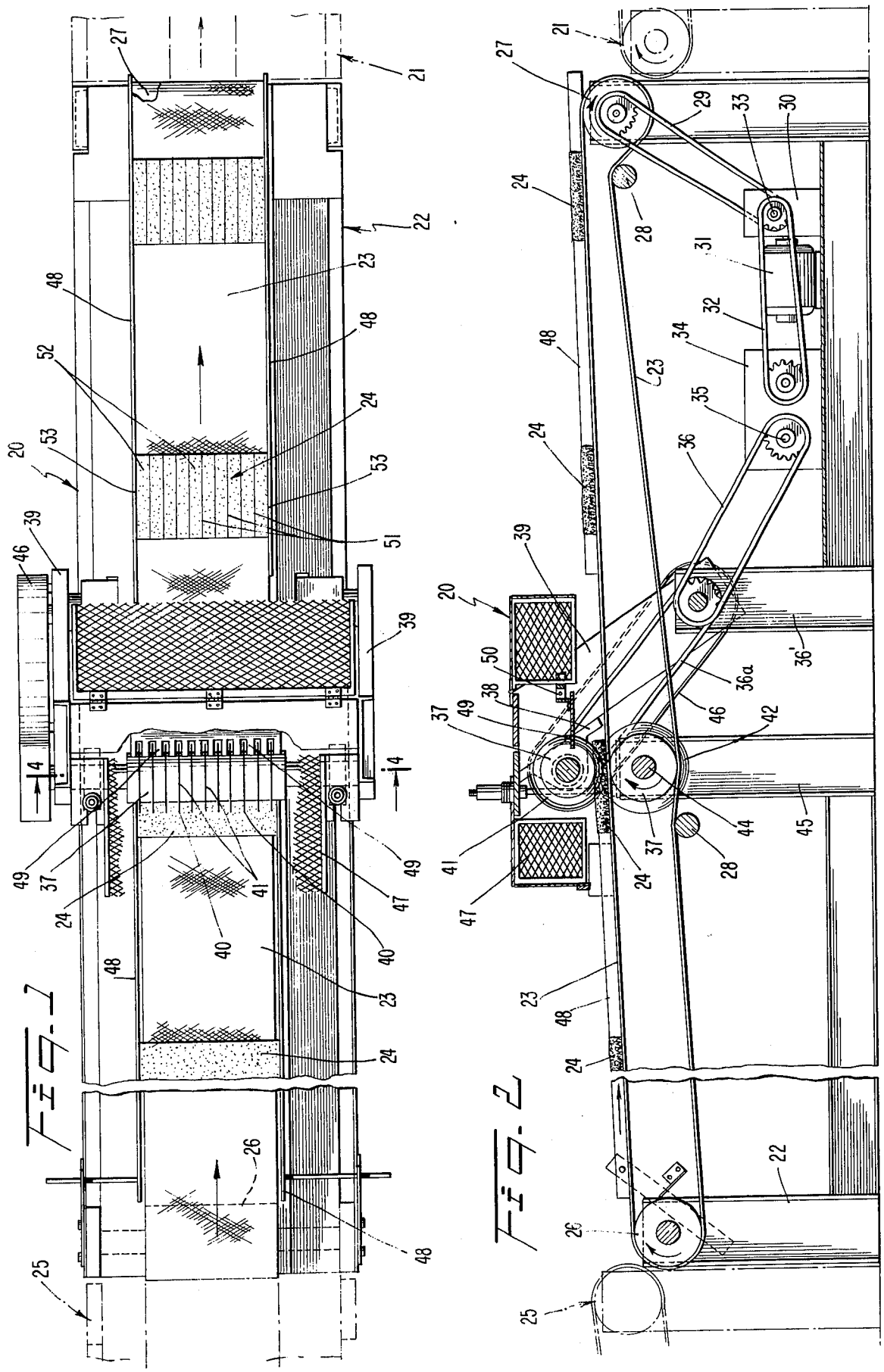

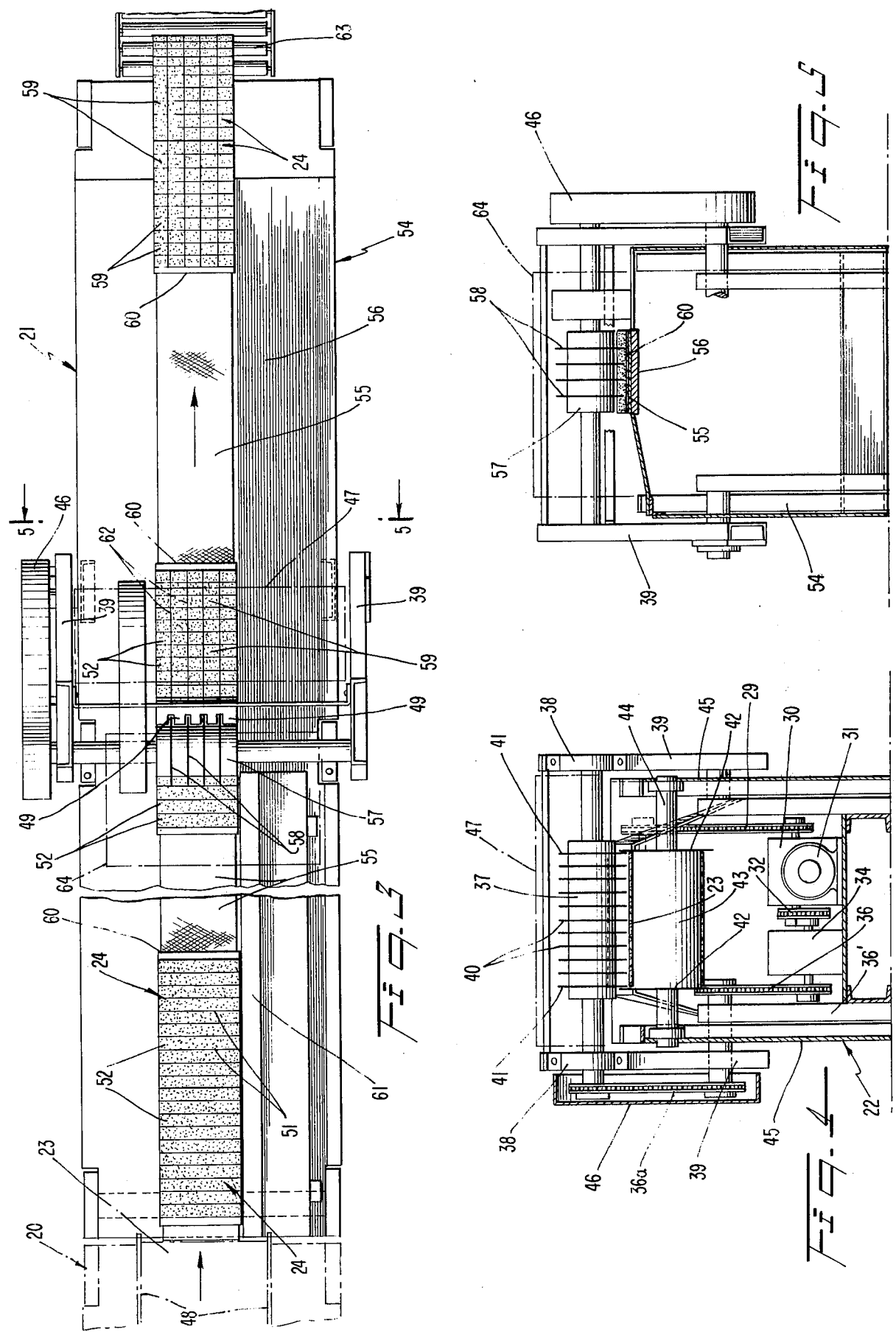

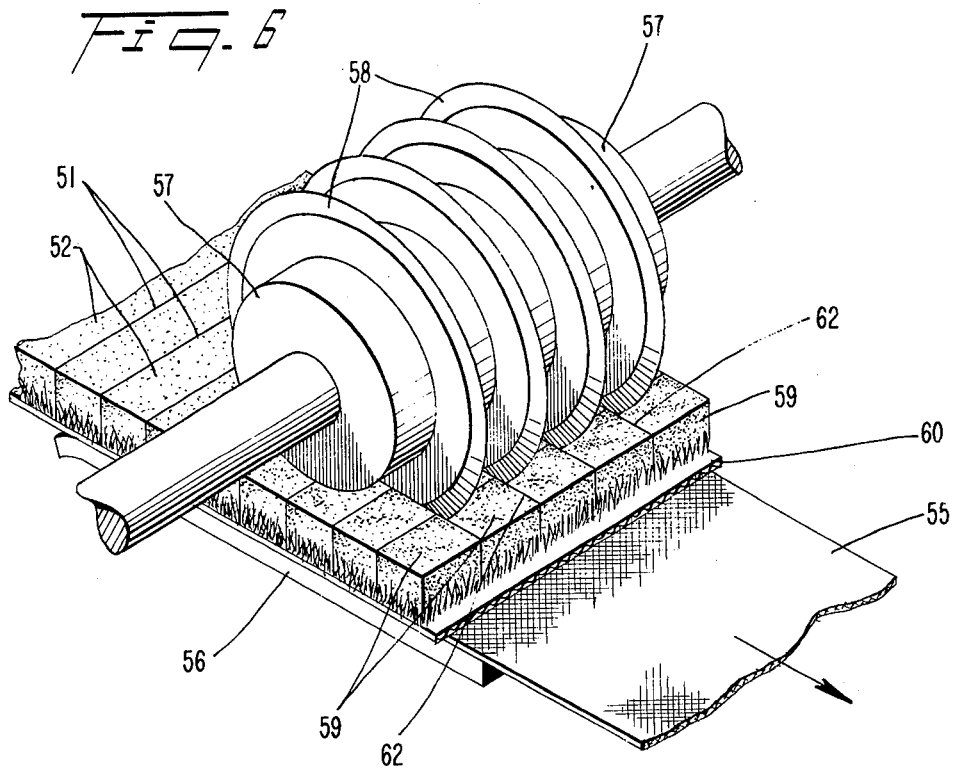
Fig. 6
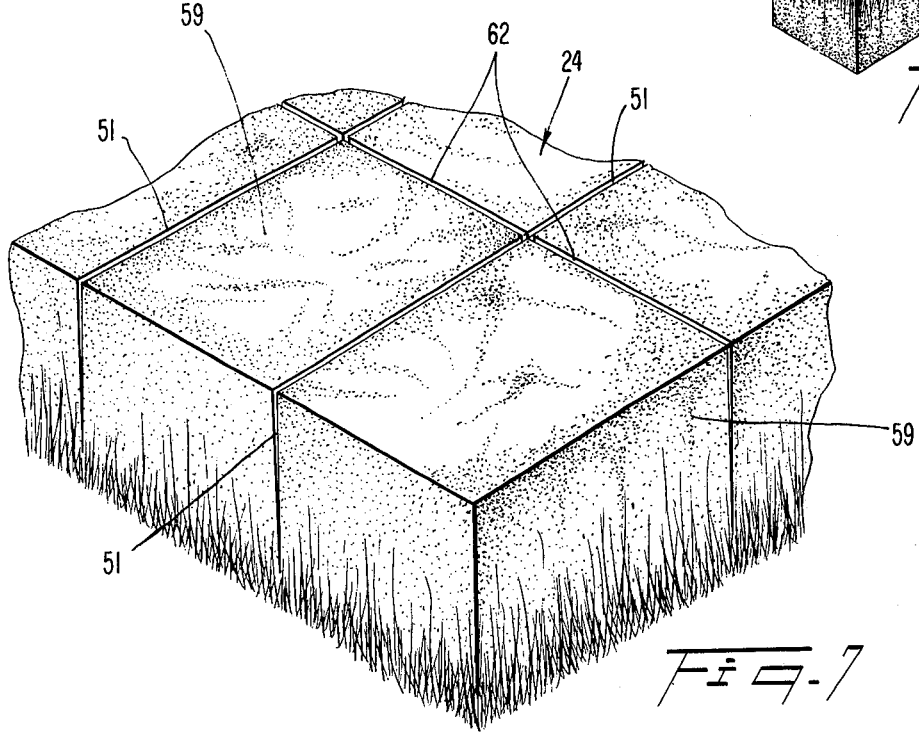
Fig. 8
Fig. 7

APPARATUS FOR TRIMMING AND SCORING CUT SOD TO PRODUCE SEPARABLE PLUGS

BACKGROUND OF THE INVENTION

The increasing recognition of Zoysia grass as the ideal lawn grass, both in terms of beauty and durability with minimum care, and the resulting increased demand for Zoysia sod have given rise to commercial efforts to process the sod on a large scale basis for packaging and shipment to distant consumers. Relatively small cut sod sections are provided for easy handling and each section is sub-divided into a number, such as fifty, easily separable plugs. Several such sod sections, such as six or eight, are packaged for shipment by mail or private carrier.

As a part of the processing of the Zoysia sod to properly condition it for shipment and use most conveniently and economically, cut sod sections following the removal of excess moisture and soil are scored in two coordinate directions on the soil side and trimmed to accurate lengths. The purpose of this invention is to provide an efficient, practical and economical high production apparatus for scoring and trimming the sod with a minimum of hand labor and in a way which will not damage the product in terms of its ultimate utility.

SUMMARY OF THE INVENTION

Approximately rectangular cut sod sections are placed on a conveyor and are carried through a first scoring and trimming apparatus which cuts or scores the soil side of the sod partially through the root network, while simultaneously trimming the ends of each section to a uniform length, the sod sections already possessing a uniform width when harvested from the growing field.

Following the first scoring and trimming operation, pairs of sod sections are turned 90 degrees to their direction of movement and placed on cardboard trays which are employed in the packaging procedure, and while on these trays are conveyed through a second scoring apparatus which cuts or scores the soil side of the sod in a second coordinate direction to produce on each sod section a multiplicity of attached but easily separable rectangular plugs. From the second scoring station, the sod is conveyed toward a packaging station which is not a part of this invention.

BRIEF DESCRIPTION OF THE DRAWINGS

FIG. 1 is a plan view of sod scoring and trimming apparatus embodying the invention and particularly showing a first section of the apparatus.

FIG. 2 is a side elevation of the apparatus depicted in FIG. 1.

FIG. 3 is a plan view of a second section of the apparatus particularly showing the second scoring station.

FIG. 4 is a transverse vertical section taken on line 4—4 of FIG. 1.

FIG. 5 is a similar section taken on line 5—5 of FIG. 3.

FIG. 6 is a fragmentary perspective view showing the second scoring means.

FIG. 7 is a fragmentary perspective view of the scored product.

FIG. 8 is a perspective view of one separated sod plug.

Referring to the drawings in detail wherein like numerals designate like parts, the apparatus which embodies the invention comprises two coacting sections, namely, a first scoring and trimming section 20, FIGS. 1 and 2, and a second scoring section 21, FIG. 3. The first apparatus section 20 comprises a support frame 22 for an endless flexible conveyor belt 23 which may be slightly inclined but generally level. The upper run of the belt 23 slides over a solid apron and is in a flat condition for the support and conveyance of cut sod sections 24 delivered to the apparatus from a suitable upstream conveyor means 25 forming no part of this invention. The belt 23 is trained over end rolls 26 and 27 and also engages slack take-up rolls 28 suitably mounted beneath the conveyor apron. The downstream roll 27 is driven in the indicated direction by sprocket gearing 29 connected with a speed reducer 30 driven by a motor 31. Additional sprocket gearing 32 connects the output shaft 33 of speed reducer 30 with a second speed reducer 34, having an output shaft 35 connected with and driving sprocket gearing 36. The gearing 36, FIG. 4, is disposed inboard of an intermediate support post 36' for the gearing and additional outboard sprocket gearing 36a, partially supported on the post 36', delivers power to a cutting or scoring roll 37 mounted above the conveyor belt 23 in bearings 38 carried by rigid arms 39.

The power driven scoring roll 37 has preferably nine equidistantly spaced sod scoring blades 40 thereon and a single pair of end trimming blades 41 which coact with a pair of underlying trimming blades 42 on the opposite ends of a lower roll 43 which also serves as an intermediate idler roll and support roll for the belt 23 at the cutting area. The shaft 44 of roll 43 is journaled for rotation on a pair of upstanding frame posts 45, as shown. A safety housing 46 for the outboard gearing 36a is provided, as well as an overhead safety guard 47 for the scoring and trimming rolls.

Laterally adjustable guide rails 48 are provided immediately above and on opposite sides of the belt 23 both upstream and downstream of the rolls 37 and 43 so that the sod sections 24 may be properly centered and aligned during the scoring and trimming operation.

To prevent any tendency for the sod sections 24 to be lifted from the belt 23 by the scoring roll 37, a plate having a plurality of hold-down fingers 49 is attached at 50 to the guard structure with the fingers 49 blocking upward displacement of sod sections with the roll 37 should this occur.

It may be observed in connection with FIGS. 1, 2 and 4 that the single drive motor 31 and described speed reducers and sprocket gearing operate the belt 23 and the scoring and trimming roll 37 in unison with the belt traveling in the direction of the arrows, and the blades 40 and 41 turning counterclockwise in FIG. 2, the underlying blades 42 idling in the clockwise direction during the trimming operation.

The cut sod sections 24 are deliverd by the means 25 from upstream prior processing means including excess soil remover means, forming no part of this invention. At the point of transference of the sod sections onto the belt 23 from the means 25, an attendant inverts the cut sod sections so that their soil sides face upwardly and their grass sides downwardly on the belt 23. The sod sections 24 are rectangular and have an approximately uniform or consistent 10 inch width when removed from the growing field. They are cut to approximately 15 inch lengths. When inverted and placed soil side up on the belt 23 between the guide rails 48, the longer 15 inch dimension is placed across the belt 23 and the shorter 10 inch dimension lengthwise of the belt. The side edges of the sod sections defining the 10 inch width require no trimming because they are uniform. However, the ends defining the 15 inch dimension require trimming by the first apparatus sectin 20 and this end trimming is produced accurately by the coacting blades 41 and 42 as each sod section in succession is carried by the belt 23 between the rolls 37 and 43.

Simultaneously with the trimming of the sod sections 24, their upper soil sides are cut or scored as at 51 by the blades 40 in equidistantly spaced parallel directions entirely across the sod sections. The scores 51, however, are not formed entirely through the root network of the sod so that the resulting ten parallel strips 52 produced by the scoring remain attached in the sod section. The trimmed end edges are indicated at 53 in the drawings. The second apparatus section 21 is similar to the described section 20 and is immediately downstream therefrom in longitudinal alignment, as shown. It includes an independent frame 54 supporting a longitudinal conveyor belt 55 similar to the belt 23. Like the belt 23, the top run of conveyor belt 55 slides over a solid bed or apron 56 of the apparatus section 21. Like the apparatus section 20, scoring apparatus section 21 has a scoring roll 57 near its longitudinal center, preferably having four equidistantly spaces scoring blades 58 but no end trimming blades like the blades 41 of rolls 37. Also, the apparatus section 21 lacks a trimming roll such as the previously-described roll 43, because trimming of the sod at the edges defining the 10 inch width is not required, as explained.

It might be mentioned here that the dimensions of the cut sod sections 24 and the number and spacing of the scorings produced in the apparatus, while not critical, are preferred and convenient dimensions. It has been found convenient and practical to provide customers with scored sod sections of the described dimensions, each having fifty square plugs 59, FIGS. 7 and 8, which can be readily separated from planting in a lawn. In some cases, however, the dimensions of the sod sections as well as the number of separable plugs and the size of the plugs could be varied under the invention. The stated dimensions and numbers are illustrative only and should not be taken in a limiting sense.

The drive means for the conveyor belt 55 and associated scoring roll 57 may be identical to the drive means shown and described for the apparatus section 20 and therefore need not again be described and shown in detail for the apparatus section 21. The modes of operation of the two apparatus sections 20 and 21 are therefore the same, except for the fact that the section 21 has no sod edge trimming capability.

Upon being discharged from the downstream end of apparatus section 21, an attendant places pairs of scored sod sections 24 lengthwise and end-to-end on elongated cardboard trays 60 and in so doing rotates the sod sections 90 degrees from their positions on the belt 23 so that the relatively narrower widths of the sod sections are across the belt 55 and the longer dimension is lengthwise of the belt. The apparatus section 21 has an upstream aligning rail 61 for the cardboard trays 60, to assure that each tray and its two sod sections 24 pass beneath the scoring roll 57 squarely and properly centered. The blades 58 of scoring roll 57 cut or score the upwardly facing soil side of the sod along plural parallel equally spaced score lines 62, FIG. 3, to produce the previously-noted approximately square connected but readily separable sod plugs 59. Like the score lines 51, the scores 62 do not penetrate through the root system entirely.

Upon completion of the second scoring operation at right angles to the first scoring, each tray 60 bearing two of the fully processed sod sections 24, FIG. 3, is now transferred to a roller conveyor bed 63 where packaging of the product takes place. The packaging conveyor 63 forms no parts of this invention. It should be noted that a safety guard 64 for the scoring rolls 57 similar to the guard 47 is provided in the apparatus section 21.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. Apparatus for trimming and scoring cut sod sections to form attached readily separable plugs thereon comprising linear generally horizontal endless belt conveyor means for cut sod sections which are substantially rectangular and which have an accurately defined width between longitudinal edges and an inaccurate length between ends of the sod sections, the cut sod sections being initially placed on the conveyor means in succession with their longer dimensions transverse to the conveyor means and their narrower and more accurate dimensions longitudinal of the conveyor means, a first scoring and trimming means on the conveyor means intermediate the ends thereof, laterally spaced parallel sod squaring and guidance rails on the conveyor means at the upstream side of said first scoring and trimming means, the first scoring and trimming means comprising a pair of top and bottom superposed rolls, the top roll arranged above the upper run of said endless belt conveyor means and the bottom roll arranged between the upper and lower runs of the belt conveyor means and serving as an idling intermediate support roll for the belt conveyor means, power means coupled with the top roll to drive it, a plurality of axially spaced parallel sod scoring disc blades and a pair of end trimming blades on the top roll turning therewith, a single pair of end trimming blades only on the bottom roll and lying immediately outwardly of the end trimming blades of the top roll, the upper run of the belt conveyor means having its longitudinal edges disposed immediately inwardly of the trimming blades of the bottom roll and beneath the sod scoring blades of the top roll, whereby the cut sod sections on the upper run of the belt conveyor means receive plural parallel lines of scoring and have their opposite ends trimmed to accurate and uniform lengths as they pass between said top and bottom rolls of the first scoring and trimming means, and a second sod scoring means on the linear belt conveyor means downstream from the first scoring and trimming means for scoring the cut sod sections at right angles to said scoring lines produced at said first scoring and trimming means following rotation of the sod sections ninety degrees on the upper run of the belt conveyor means, said second sod scoring means comprising a single transverse axis roll above the upper run of the belt conveyor means, an opposing solid bed plate immediately below and supporting said upper run, power means coupled with said single transverse axis roll to drive it, and a plurality of axially spaced parallel sod scoring disc blades on the single transverse axis roll whereby the cut sod sections moving with said upper run receive plural parallel lines of scoring while passing through said second sod scoring means to thereby complete the formation of multiple rectangular plugs on each cut sod section which are uniformly sized and easily separable for usage.

2. Apparatus for trimming and scoring cut sod sections as defined in claim 1, and stationary sod hold-down plates on said first and second trimming means including finger extensions interdigitated with said axially spaced parallel disc blades.

3. Apparatus for trimming and scoring cut sod sections as defined in claim 2, and a safety guard means substantially enclosing said top roll of the first scoring and trimming means and said single transverse axis roll of the second sod scoring means.

* * * * *